(12) United States Patent
Pingel (10) Patent No.: US 10,942,078 B2
(45) Date of Patent: Mar. 9, 2021

(54) MEASUREMENT OF PRESSURE IN PRESSURE-FILLED CONTAINERS WITH FLEXIBLE WALLS, IN PARTICULAR TIRES

(71) Applicant: TYCKit GmbH, Marl (DE)

(72) Inventor: Ulrich Pingel, Marl (DE)

(73) Assignee: TYCKit GmbH, Marl (DE)

( * ) Notice: Subject to any disclaimer, the term of this patent is extended or adjusted under 35 U.S.C. 154(b) by 145 days.

(21) Appl. No.: 16/428,553

(22) Filed: May 31, 2019

(65) Prior Publication Data
US 2020/0378852 A1    Dec. 3, 2020

(51) Int. Cl.
*G01L 17/00* (2006.01)

(52) U.S. Cl.
CPC .................. *G01L 17/005* (2013.01)

(58) Field of Classification Search
None
See application file for complete search history.

(56) References Cited

U.S. PATENT DOCUMENTS

| | | |
|---|---|---|
| 1,670,685 A | 5/1928 | Marks |
| 2,251,803 A | 8/1941 | Pummill |
| 2,313,156 A | 3/1943 | Kratt, Jr. |
| 2,384,437 A | 9/1945 | Boynton |
| 3,019,642 A | 2/1962 | Gallagher |
| 3,735,344 A | 5/1973 | Weintraub |
| 4,067,235 A | 1/1978 | Markland |
| 4,089,226 A | 5/1978 | Kraska |
| 4,102,184 A | 7/1978 | Castleberry |
| 4,355,299 A | 10/1982 | Cook, Jr. |
| 4,615,211 A * | 10/1986 | Kolm .................. G01L 17/005 73/146.2 |
| 4,630,470 A | 12/1986 | Brooke |
| 4,996,516 A | 2/1991 | Mason |
| 5,962,779 A | 10/1999 | Bass |
| 6,343,506 B1 | 2/2002 | Jones |
| 7,222,522 B2 | 5/2007 | Monguzzi |

(Continued)

FOREIGN PATENT DOCUMENTS

| | | |
|---|---|---|
| AT | 209076 B | 5/1960 |
| CN | 87203249 U | 2/1988 |
| CN | 2095791 U | 2/1992 |

(Continued)

*Primary Examiner* — Peter J Macchiarolo
*Assistant Examiner* — Jermaine L Jenkins
(74) *Attorney, Agent, or Firm* — Nixon Peabody LLP (57) ABSTRACT

A device for measuring a pressure in a pressurized vessel with an at least partially flexible wall. The device includes a sensor head and a device for pressing a contact surface of the sensor head against the wall. The sensor head has a detection region of the contact surface and a support edge that surrounds the detection region and is arranged in a continuation of the contact surface. A detection device is provided in the detection region for detecting a measured value for a force or pressure. An evaluation unit evaluates a progression of the measured value during a movement of the sensor head relative to the wall. A contact measured value p* is determined from a portion of the progression indicating that the pressure acting on the detection region is at least substantially equal to the pressure acting on the support edge. A pressure value is assigned to the contact measured value p*.

20 Claims, 6 Drawing Sheets

(56) References Cited

U.S. PATENT DOCUMENTS

2005/0072224 A1     4/2005     Huang

FOREIGN PATENT DOCUMENTS

| | | |
|---|---|---|
| CN | 2483217 Y | 3/2002 |
| CN | 1651882 B | 6/2010 |
| CN | 102445300 A | 5/2012 |
| CN | 102460099 A | 5/2012 |
| DE | 695720 C | 8/1940 |
| DE | 830115 C | 1/1952 |
| DE | 1054739 B | 4/1959 |
| DE | 2361675 A1 | 6/1974 |
| DE | 3620638 C2 | 12/1989 |
| DE | 29613467 U1 | 11/1997 |
| DE | 20200489 U1 | 5/2002 |
| DE | 102004040790 A1 | 3/2006 |
| DE | 102010017293 A1 | 12/2011 |
| DE | 102010026872 A1 | 1/2012 |
| DE | 102009058882 A1 | 2/2012 |
| DE | 102011055886 A1 | 5/2012 |
| EP | 0380425 B1 | 4/1995 |
| EP | 0681168 A2 | 11/1995 |
| EP | 0756167 B1 | 9/2001 |
| EP | 1561608 B1 | 7/2008 |
| EP | 1970223 B1 | 7/2010 |
| EP | 2440899 B1 | 8/2013 |
| EP | 2705963 A2 | 3/2014 |
| FR | 659950 A | 7/1929 |
| JP | H 07266815 A | 10/1995 |
| JP | 2005-091335 A | 4/2005 |
| JP | 2006-021691 A | 1/2006 |
| KR | 20040000770 A | 1/2004 |
| KR | 20090058935 A | 6/2009 |
| SU | 1397757 A1 | 5/1988 |
| WO | WO 1989/010851 A1 | 11/1989 |
| WO | WO 1998/053289 A1 | 11/1998 |
| WO | WO 2000/036382 A2 | 6/2000 |
| WO | WO 2013/043541 A2 | 3/2013 |

\* cited by examiner

MEASUREMENT OF PRESSURE IN PRESSURE-FILLED CONTAINERS WITH FLEXIBLE WALLS, IN PARTICULAR TIRES

According to a first aspect, the invention relates to a device for measuring a pressure in a pressurized vessel having at least a partially flexible wall such as a tire. Moreover, the invention relates to a method for measuring the pressure in a pressurized vessel.

One particular use of the devices and method according to the invention is the measurement of pressure in vehicle tires. Whereas the invention is not at all restricted to this aspect, the following description primarily relates to this application.

To measure the pressure of a tire on a vehicle, primarily measuring devices are used to connect to the valve. A relatively large amount of effort is however required to connect the devices to the valve, in particular when checking a plurality of tires, for example on a truck. Moreover, soiling and wear can occur when the tire pressure is frequently checked due to the increased stress on the valve.

Devices and methods have already been proposed by which a measurement of the tire pressure is enabled without connecting a measuring device to the valve. For example, EP 2 440 899 B1 describes a device and a method for testing the filling pressure of a vehicle tire while it is being moved over the device in a direction of travel. An arrangement of sensors extends over the direction of travel and has a lateral extension which is sufficient to record the width of the vehicle tire. Each of the sensors is a load sensor that provides varying outputs while the tire is moved in the direction of travel. The outputs of the sensors are processed by a scanning system, and a value for the filling pressure is calculated.

EP 0 380 425 B1 describes a diagnostic mechanism and method for the pressure in vehicle tires in which a local deformation of a tire is generated and the rigidity is ascertained in order to derive the pressure therefrom. A force sensor measures the behavior over time of the force of the local deformation and emits an electrical signal that is processed by a microprocessor.

WO 2013/043541 A2 describes a mechanism for measuring tire pressure. The mechanism comprises a data-recording impact module which strikes a tire in order to generate data with regard to the force exerted on the tire as a function of time and transmit the data to a data recording module. A data processing module processes the data in order to ascertain the pressure.

The object of the invention can be considered that of proposing a device and method by which the measurement of pressure in a pressurized vessel with at least a partially flexible wall is feasible with a very simple design and simple handling.

According to an embodiment of the invention, a device comprises at least one sensor head and a device for pressing a contact surface of the sensor head against a flexible wall of the pressurized vessel, i.e., in particular a tire wall, preferably a tire sidewall. The contact surface is preferably flat, but it may also be curved to adapt to different vessel shapes (tire shapes). The sensor head is pressed by a pressing force against the wall such that it presses the wall in, i.e., deforms it against the pressure acting from the inside of the vessel.

According to the invention, the sensor head has a contact surface detection region and a support edge that surrounds the detection region and which is arranged in a continuation of the contact surface. The detection region forms the main part of the contact surface to be pressed against the wall. "Arrangement of the support edge in a continuation thereof" should be understood to mean that the support edge at least substantially forms an unaltered continuation of the contact surface, i.e., does not substantially project or drop relative to the surface of the detection region.

In the detection region, a detection device is provided for detecting a measured value for a force or pressure. Preferably the force acting on the detection region upon applying the contact surface to the wall is detected as a measured value, or a pressure resulting from this force. The measurement according to the invention involves the detection of an (inner) pressure that is transmitted through the wall and the contact surface to the sensor head. Consequently, any type of pressure sensor can be used on the sensor head, for example a piezoelectric pressure sensor. Since on the other hand the measuring surface, i.e., the surface of the detection region is known, the pressure can also be determined by a measurement of force so that any type of sensor of force, in particular a pressing force, can be used. Moreover, the detection device can preferably comprise mechanical transmission elements for force, or respectively pressure from the contact surface to a sensor in order to ensure particularly effective coupling and detection.

According to the invention, the device has an evaluation unit to evaluate measured values detected by the detection device. The evaluation unit can be arranged on the sensor head or at a distance therefrom, connected to the sensor head. It is designed to evaluate a progression of the measured value over time or distance during a movement of the sensor head relative to the wall, which may also be referred to as the characteristic. For example, the progression of the measured value supplied by the detection device when pressing in the wall over time and/or over distance traveled may be evaluated.

In so doing, the evaluation according to the invention is performed such that at least one special measured value, which is termed a "contact measured value" in this context, is determined from the characteristic or progression. This measured value, or respectively the contact situation of the sensor head in which this measured value occurs, is defined in that the pressure acting on the detection region is at least substantially equal to the pressure acting on the support edge.

The special aspect of using the sensor head according to the invention with a detection region and surrounding support edge and evaluating supplied measured values with regard to determining the contact measured value is that, as will be described in greater detail below with reference to exemplary embodiments, the total of forces acting between the sensor head and wall are distributed between the detection region and the support edge when pressing the sensor head designed according to the invention against the flexible wall. As was surprisingly revealed, a contact situation is of particular interest in which the wall is pressed in far enough by the sensor to produce a situation of "complete contact", i.e., the flexible wall lies evenly against the detection region and the support edge, i.e., with the same pressure. In this measuring position, or respectively at the associated measuring time, the detected measured value for force, or respectively the local pressure, precisely corresponds to the force, or respectively pressure acting in the interior of the vessel. It is therefore possible to discern the situation of complete contact by observing the progression of the measured value in order to ascribe a pressure value for the inner pressure of the vessel to the measured value measured in this situation.

The recognition of "complete contact", i.e., a contact with equal pressure on the detection region and support edge, can be done in various ways. For example, the pressing force of the sensor head can be measured in addition to detecting the pressure or measured value of force at the detection region. Then, by using the known surfaces of the support edge and detection region, the distribution of this pressing force can be determined, and it can thus be established whether the situation of complete contact exists.

According to a particularly preferred embodiment, the recognition of the situation of complete contact (even pressure on the detection region and support edge) can also be feasible just by observing the time characteristic (or progression) of the measured value without additional measurements. As was surprisingly revealed, initially a spherical contact primarily within the detection region with comparatively slight force acting on the support edge results during the increasing pressure of a sensor head according to the invention against a flexible wall. The situation is manifested in the progression of the measured values as a rising flank. As the impression progresses, the desired situation of complete contact then follows in which the flexible wall lies completely against the contact surface with approximately the same pressure on the detection region and support frame. As the impression increases, greater stress on the support edge occurs, whereas the detection region can be relieved. In the progression of the measured values, this may be manifested as a progression that falls at least sectionally.

Consequently, the construction according to the invention of the sensor head is particularly well-suited for measuring the pressure in a vessel with a flexible wall (tire). Given sufficient force, the described contact situations are passed through sequentially, wherein complete contact, in which the precise detection of the inner pressure is possible, can be effectively identified in the measured value progression by determining the maximum. Accordingly, effective detection of the inner pressure is easily possible with a simply structured device and signal processing. In addition or alternatively to determining the maximum, the measured values can however also be evaluated in a different manner. For example, the time progression (or characteristic) of the measured value can be evaluated with regard to the ramp rate, or a compensation of the ramp rate can be provided at least when determining the maximum.

According to a further embodiment of the invention, a vessel open toward the contact surface can be formed on the sensor head, wherein the support edge is configured on a side wall of the vessel, and the detection device can be arranged in the interior of the vessel. This arrangement has proven to be constructively beneficial. By pressing the open vessel against the wall, forces are applied both to the support edge as well as to the detection device so that the forces are distributed corresponding to the contact situation.

According to another preferred embodiment, the detection device can have at least one plate independent of the support edge on the contact surface. The plate is accordingly not rigidly connected to the support edge and is independent therefrom, for example at least slightly movable relative to the support edge. The plate can for example either be rigid or have a certain flexibility, for example in order to compensate for unevenness in the wall. Such a plate in the region of contacting the wall can in particular serve for the detected force, or respectively the detected pressure against the detection region, to be averaged over the detection surface. Accordingly, unevenness in the wall such as notches, elevations, lettering, etc. can influence the measured value less strongly.

According to a further embodiment of the invention, a flexible transmission body can be provided on the sensor head, in particular between the contact surface and a pressure or force sensor. Particularly preferably, a flexible transmission body can be arranged between one or more plates which can move relative to the support edge and the respective sensor. The flexible transmission body is preferably deformable, but not compressible. It accordingly serves to transmit the force, or respectively the pressure. Particularly preferably, a body, or respectively a layer is made of a gel such as silicone, acrylic, etc. In the case of the preferred embodiment of the sensor head with an open vessel, it has proven to be particularly preferable when the force or pressure sensor, the plate which can move relative to the support edge, and/or the flexible transmission body are arranged within the vessel. A design is particularly preferable in which the rigid plate, the transmission body underneath, and the force or pressure sensor thereunder or respectively entirely or partially embedded therein, are arranged within the vessel on the contact surface.

An individual measured value such as a pressure or force value can be detected for the effect of the flexible vessel wall on the detection region. Preferably, it is then a value averaged over the detection surface. It is however also possible for separate pressure or force measured values to be determinable for parts, or respectively sections of the detection region. For example, the detection region can comprise at least one first or one second partial detection region, and the detection device can have at least one first force or pressure sensor for the first partial detection region, and a second force or pressure sensor for the second partial detection region. In the same manner, three partial detection regions and associated sensors or more can also be provided. By separately detecting a plurality of partial detection regions, it can in particular be checked whether the effects of force are acting more or less evenly over the contact surface. For example, a skewed arrangement of the sensor head on the wall would be discernible by significant differences in the measured values for different partial detection regions so that the measurement can for example either be rejected, or a compensation for the skewed contact can be included. Moreover, it is possible to movably affix the sensor head on the device to better adapt the position of the sensor head to the wall. For example, at least one articulation for aligning the sensor head can be provided on the device, in particular the sensor head can for example be gimballed in order to adapt to the angle of tilt of the surface.

The sensor head and the device can have different designs and sizes depending on the structural parameters and the purpose (tire size). A round shape of the detection region is preferred for the sensor head; likewise, other for example angled shapes can however also be used. The width of the sensor head (i.e., the outer diameter in the case of a round sensor head, for example the diagonal of a square sensor) can for example be 3-6 cm, wherein however larger or smaller dimensions are also possible. The support edge is preferably arranged directly adjacent to the detection region with a very small gap; it can, however, also be arranged at a distance thereto.

The width of the support edge should preferably be selected at least so that the pressing forces can be absorbed there, in particular so that the support edge remains rigid in comparison to the detection region. In this case, the width of the support edge can have any desired ratio in comparison to the detection region.

In preferred embodiments, the support edge can be relatively narrow in comparison to the detection region. For example, the support edge in the cross-section of the sensor head can have a width of 10% or less in comparison to the width of the detection region. Values for the width of the support edge of 0.5 to 20%, preferably 1 to 5%, for example, have proven to be useful for the detection.

In an alternative embodiment, a very wide support edge can also be provided that for example has a cross-section of at least 20% of the width of the detection region, preferably more than 50%. The width of the support edge can even be the same or greater than the width of the detection region. However, in some cases with a very wide support edge, the measured value of the pressure or force did not manifest a falling time characteristic, but rather an asymptotic characteristic. The maximum value measured (over the duration of measurement) can then be used to determine the pressure value with such a characteristic as well. Easier signal evaluation is however routinely possible with a thinner support edge.

In principle, the sensor head can be pressed against the wall in any conceivable manner, including manually. Since, however, significant forces sometimes have to be applied given the pressure in the interior, a pressing device is provided according to a further embodiment of the invention for pressing the sensor head with a pressing force against the wall. Such a pressing device can for example comprise a lever device for generating the necessary pressing force by leverage. The pressing device can be driven manually or also by a motor. In a preferred embodiment, the pressing device can have a clamping device, i.e., the tire can for example be clamped within a clamping device such as a clamp, pliers, etc. According to another preferred embodiment, the pressing device can also have a movable mass element so that the pressing force can be applied by forces of inertia. In particular, the device can be designed like a hammer, wherein the sensor head is arranged on the mass element (hammer head). While being used, the hammer head, for example arranged on a hammer handle, is struck against the wall of the vessel in order to supply the required pressing force at least for a short period.

In a particularly preferred embodiment, the device for measuring the pressure in two vessels comprises a first and a second sensor head that preferably can be designed at least substantially the same. This aspect of the design of a device has proven to be advantageous, in particular in conjunction with the design of a sensor head according to claim 1, but may also constitute an independent aspect of the invention independent of this special design. A spreading device can be provided between a first and a second sensor head in order to move the sensor heads in opposite directions. Such an arrangement is in particular advantageous when two pressurized vessels having a flexible wall, such as vehicle tires, are arranged next to each other, i.e. with dual tires, for example. Then the device can be arranged between the walls of the vessels, and each of the sensor heads can be pressed by the spreading device against the walls. In this manner, the required pressing force can be applied very easily. Moreover, both vessels, such as tires, can be measured simultaneously.

In this regard, various embodiments of spreading devices are possible, such as linear feed devices, lever devices, etc. The spreading device can for example be driven manually or by motor as well. Particularly preferably, the spreading device comprises a swiveling lever, in particular for manual actuation, or a motor-driven linear feed apparatus.

In the following, embodiments of the invention will be further described with reference to the drawings. In the drawings.

Figure 1:
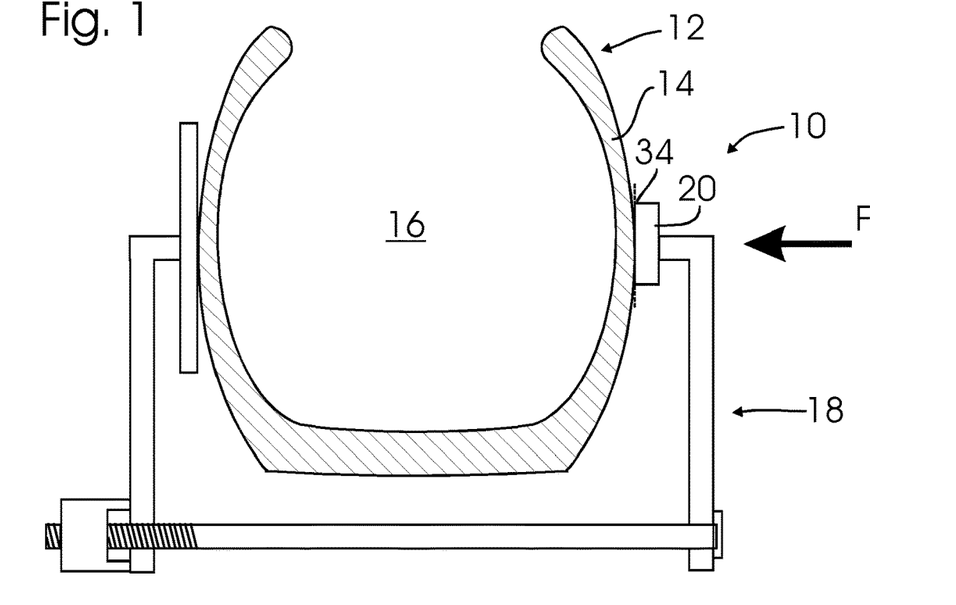
FIG. 1 shows a partially schematic side view of a first embodiment of a measuring device with a sensor head.

FIG. 1 partially schematically portrays a measuring device 10 on a vehicle tire 12 with a flexible wall 14 portrayed in a cross-section. The device 10 serves to measure the pressure in the interior 16 of the tire 12.

For this, the device 10 has a sensor head 20 which, in the shown first embodiment, is pressed by a clamping device 18 in the form of a screw clamp against the wall 14 on the sidewall of the tire 12.

Figure 2A:
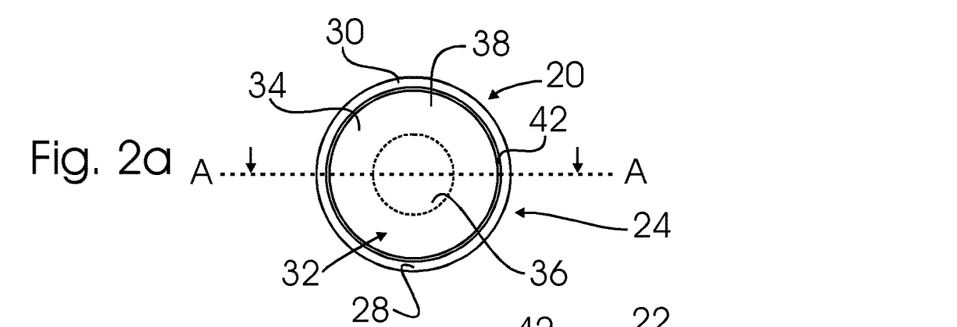
FIG. 2a, 2b show a front view and a cross-sectional view of a first embodiment of a sensor head.
Figure 2B:
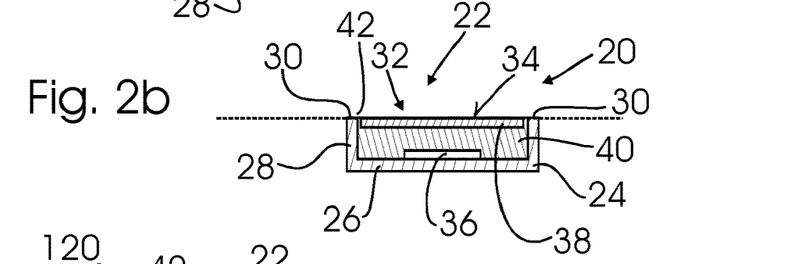

FIG. 2a, 2b show a first embodiment of the sensor head 20, wherein FIG. 2b shows the sensor head 20 in a cross-section along the line A . . . A in FIG. 2a. The sensor head 20 comprises a vessel 24 open at a front side 22 which is formed as a single part consisting of a vessel floor 26 and a surrounding vessel wall 28 proceeding therefrom. The top termination of the vessel wall 28 is formed by a support edge 30. The support edge 30 surrounds a round detection region 32.

On its front side 22, the sensor head 20 has a contact surface 34 by means of which it lies against the wall 14 of the tire 12.

In the interior of the vessel 24 surrounding the sensor head 20, a pressure sensor 36, a plate 38 and a gel filling 40 are provided.

Like the plate 38, the vessel 24 with the floor 26 and wall 28 also consist of a rigid material such as steel. In this case, the plate 38 is not connected to the wall 28; instead, a gap 42 is formed in between so that the plate 38 is movable relative to the support edge 30.

Accordingly, a pressure acting on the detection region 32, or respectively a force acting on the plate 38 on the contact surface 34 can act on the pressure sensor 36 via the non-compressible gel mass 40.

The pressure sensor 36 in the shown embodiment of the sensor head 20 can be any type of known pressure sensor such as a flat, disk-shaped piezoelectric pressure sensor. Commercially available pressure sensors can be used, i.e., piezo-resistive, capacitive, fiber-optic sensors, or sensors designed as a microchip in addition to piezoelectric sensors.

In various embodiments, the sensor head 20 can for example have an outer diameter of 3 to 6 cm. The width of the wall 28 and hence the support edge 30 can be relatively small, such as 0.5 to 4 mm. Preferably, the support edge is therefore narrow relative to the width (diameter) of the detection region. Successful tests have been performed for example with an outer diameter of 40 mm and an edge width of 2 mm. Accordingly in the preferred embodiment, the width of the edge corresponds to about 5.5% of the width (diameter) of the detection region.

Figure 3:
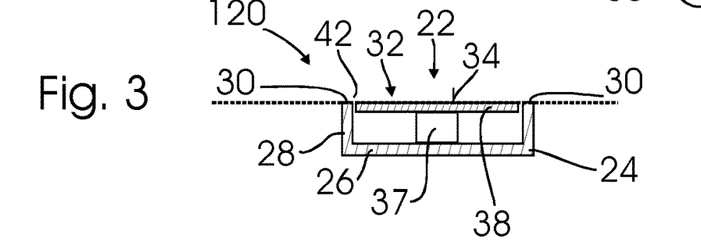
FIG. 3 shows a cross-sectional view of a second embodiment of a sensor head.

FIG. 3 portrays a second alternative embodiment of a sensor head 120 in a cross-section. The sensor head 120 according to the second embodiment corresponds in many details with the sensor head 20 according to the first embodiment so that in the following only the differences will be described in greater detail. In so doing, the same elements are provided with the same reference numbers.

The sensor head 120 according to the second embodiment differs from the sensor head according to the first embodiment in particular in that a force sensor 37 is provided under the plate 38 with which the pressing force acting at the contact surface 34 on the detection region 32, i.e., the plate 38, is detected. The gel filling 40 can be omitted in this case.

Any type of in particular commercially available force sensors can be used as the force sensor 37, for example piezo-resistive, capacitive, fiber-optic sensors, as well as sensors designed as a microchip, or strain gauges.

In the following description, primarily the preferred first embodiment of the sensor head with a pressure sensor 36 in a gel filling 40 will be referenced. As a person skilled in the art can easily recognize, the second embodiment of the sensor head 120 can however alternatively also be used.

Figure 4A:
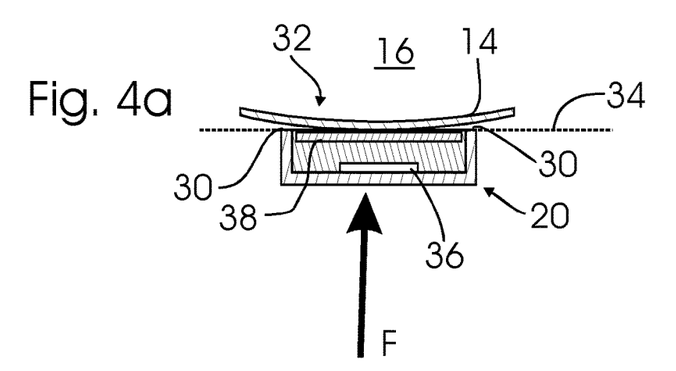
FIG. 4a-4c show a cross-sectional view of various contact situations of a sensor head according to the first embodiment against a tire wall.
Figure 4B:
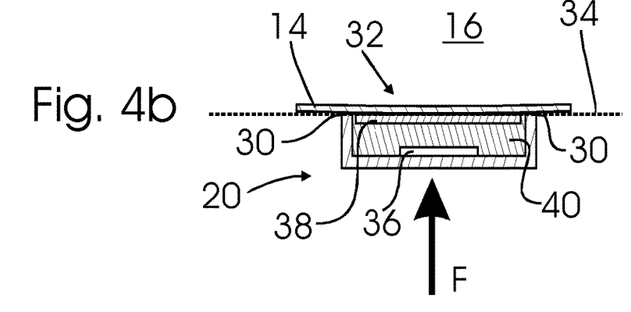
Figure 4C:
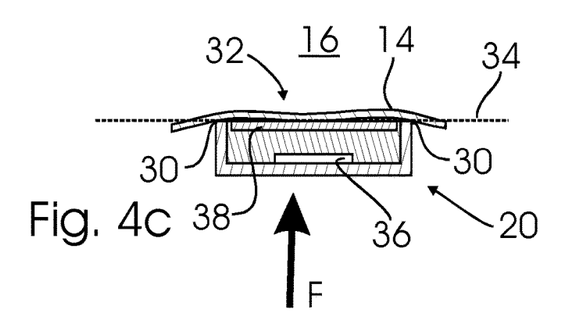

FIG. 4a-4c portray cross-sectional representations (section along the line A . . . A in FIG. 2a) of the contacting of the sensor head 20 against the flexible vessel wall 14. FIG. 4a, 4b, 4c sequentially show contact situations that occur one after the other when pressing the sensor head 20 against the wall 14 such that the wall 14 deforms.

In the initial contact according to FIG. 4a, contact between the sensor head 20 and the wall 14 occurs primarily in the middle detection region 32 due to the curvature of the wall 14. The wall 14 lies there at the contact surface 34 against the plate 38. The support edges 30 contrastingly assume less of a load.

As the pressing force F increases, or respectively the movement of the sensor head 20 relative to the wall 14 triggered thereby, an increasing characteristic of the measured values detected by the sensor 36 is manifested in the contact situation shown in FIG. 4a.

If the sensor head 20 is pressed more strongly against the wall 14 so that the wall 14 deforms, the contact situation shown in FIG. 4b ultimately results. In this case, the surface of the wall 14 of the tire lies fully against the contact surface 34 so that it acts equally on the support edges 30 and the detection region 32. In this state, the pressing force F acting on the sensor head 20 compensates for the curvature of the wall 14. Accordingly, the pressure in the interior 16 of the tire now lies completely in the detection region 32 and is transmitted via the plate 38 and the gel filling 40 to the pressure sensor 36. In this contact situation, the pressure in the interior 16 can accordingly be detected by means of the sensor 36.

The contact situation according to FIG. 4b corresponds to a maximum in the characteristic of the measured values detected with the sensor 36. This maximum value is readily discernible in the evaluation of the time characteristic of the values supplied by the sensor 36 and is termed a contact measured value in this context since it is the measured pressure value when the surface of the sensor head 20 fully contacts the wall 14.

As the pressing force F increases further, the sensor head 20, as shown in FIG. 4c, is pressed even more against the wall 14 even after full contact (FIG. 4B), and presses it in even further. This produces a deformation of the wall 14 such that the middle detection region 32 is relieved, and a larger part of the force is absorbed by the support edge 30. A decreasing trend is manifested in this contact situation in the detection of a time characteristic (or progression) of the values recorded by the sensor.

Figure 5:
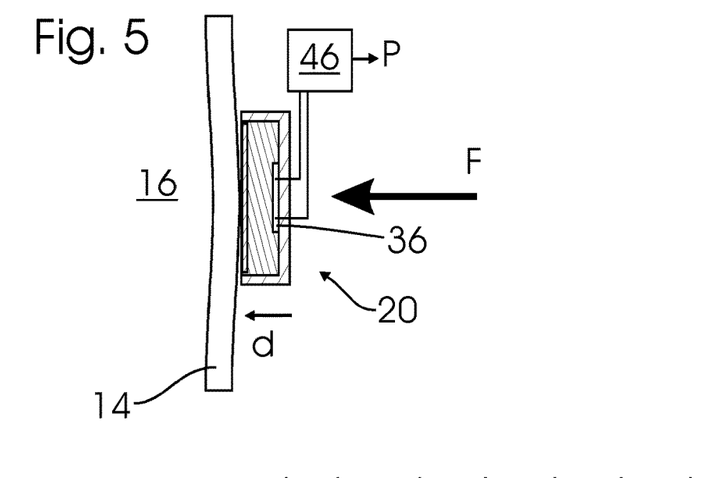
FIG. 5 shows a schematic representation of the sensor head according to FIG. 2a, 2b, 4a-4c with measured value detection.

FIG. 5 schematically shows a test setup in which the sensor head 20 is pressed against the wall 14 of a tire, and the sensor signal from the sensor 36 is evaluated by an evaluation device 46, and measured values are output for the pressure p. The feed of the sensor head relative to the wall 14 is indicated as displacement value d. As can be seen from FIG. 6, the sensor head 20 is repeatedly pressed sequentially against the wall 14 in the test setup in FIG. 5 and thereby presses it in.

Figure 6:
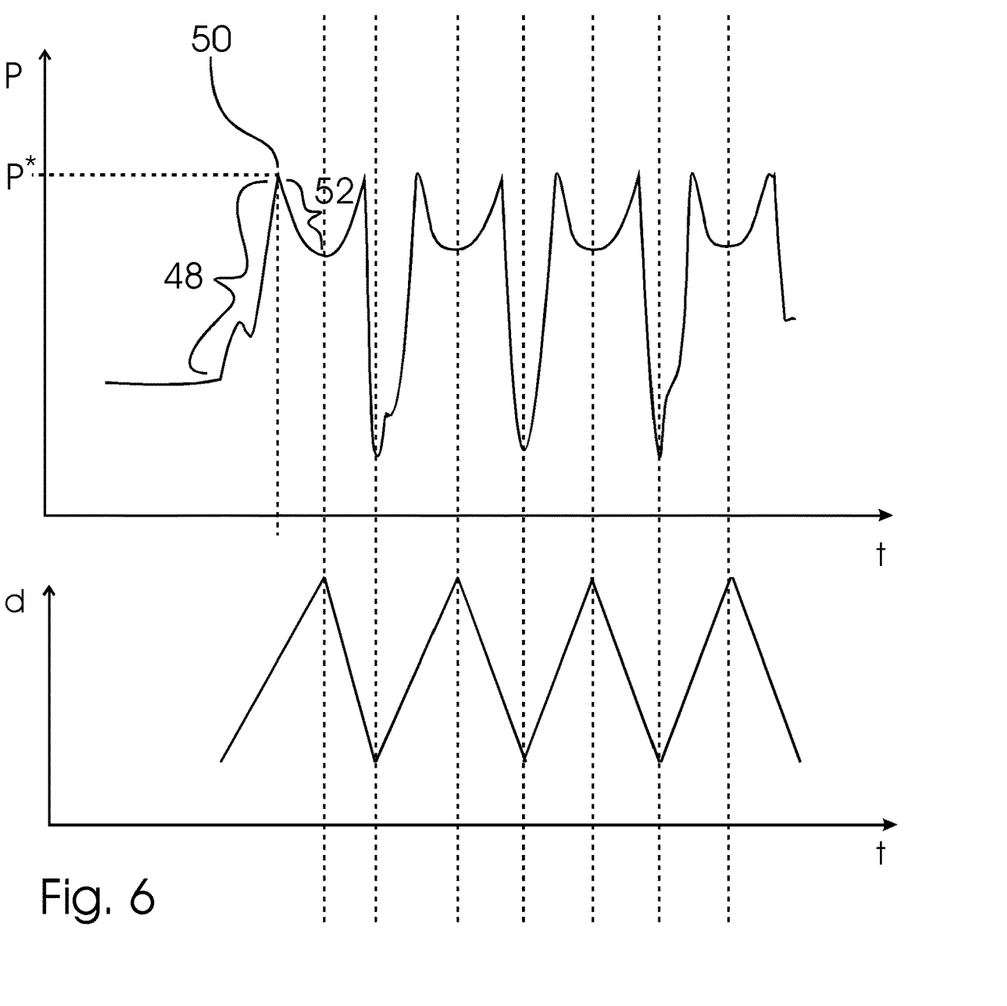
FIG. 6 shows charts of time progressions of measured values on the sensor head from FIG. 5.

The curve of the measured values p portrayed at the top in FIG. 6 first shows a rising curve section 48 in each of the tests. This corresponds to the initial contact situation according to FIG. 4a.

Then the curve reaches a maximum value, i.e., the contact measured value p*, at a point 50. This corresponds to the complete contact of the sensor head 20 against the tire wall 14 shown in FIG. 4b.

As the sensor head 20 moves further against the wall 14, a falling curve section 52 then results which corresponds to the contact situation according to FIG. 4c.

During the subsequent retraction of the sensor head 20, the reverse curve characteristic results. Otherwise, the curve repeats again each time the sensor head 20 is pressed against the wall 14.

By monitoring the time characteristic of the measured values for the pressure p, the pressure in the interior 16 of the tire 12 can thus be determined in a particularly easy manner, i.e., by observing the contact measured value when determining the maximum value p* at the maximum point 50. It is very easily possible to determine the maximum value when evaluating the signal. Moreover, no other measurements need to be made or other parameters taken into account. In particular, a measurement of the path d is unnecessary. The characteristic curve shape from FIG. 6 (top) can be evaluated without for example having to take into account the speed, the applied force F, or the path d traveled when pressing in the wall 14.

However, it can be quite advantageous to record other parameters and take them into account in the evaluation. For example, the path d can accordingly be measured, and the characteristic of the force, or respectively the pressure along the path can be considered. It was revealed that effects such as friction within the wall, the angle of attack of the sensor head relative to the wall and the shape of the wall can produce different characteristics. By considering the pressure and the force over the path, more precise pressure values p* may be determined by using suitable evaluation algorithms, or respectively the influences of errors can be recognized. For example, a lateral oblique position can be recognized, and the measuring certainty and precision can thus be increased. In addition, beyond merely detecting only the first maximum value, other evaluation algorithms can also be used, for example with the formation of averages of the two maximum values visible in FIG. 6 for each pressing.

In alternative embodiments, the contact measured value p* which represents full surface contact can be found in another manner instead of determining a maximum value. For example, the entire force F acting on the sensor head 20 can accordingly be measured. The full surface contact situation according to FIG. 4b can then be recognized in that the pressure acting on the detection region 32 is compared with the pressure acting on the support edge 30. This can be determined in that the difference between the overall force F and the force thereof acting on the detection region 32 is formed and divided by the known surface of the edge region 30.

It was even revealed that measurement is possible largely independent of parameters of the tire, such as the tire size, the thickness of the tire wall, etc. as long as only a sufficient force F is applied in order to press the sensor head 20 sufficiently to achieve full contact (FIG. 4b). The measuring device can accordingly be universally used for measuring pressure on a wide range of tire types.

Whereas in the embodiment shown in FIG. 1 the force F for pressing the sensor head 20 against the wall 14 is applied by the clamp/clamping device 18, other devices can alternatively be used. In one particularly preferred second embodiment of a measuring device 110 according to FIG. 8, the measuring device 110 is designed as a hammer with a hammer head 54 on a handle 56. The sensor head 20 is attached to the hammer head 54.

Figure 8:
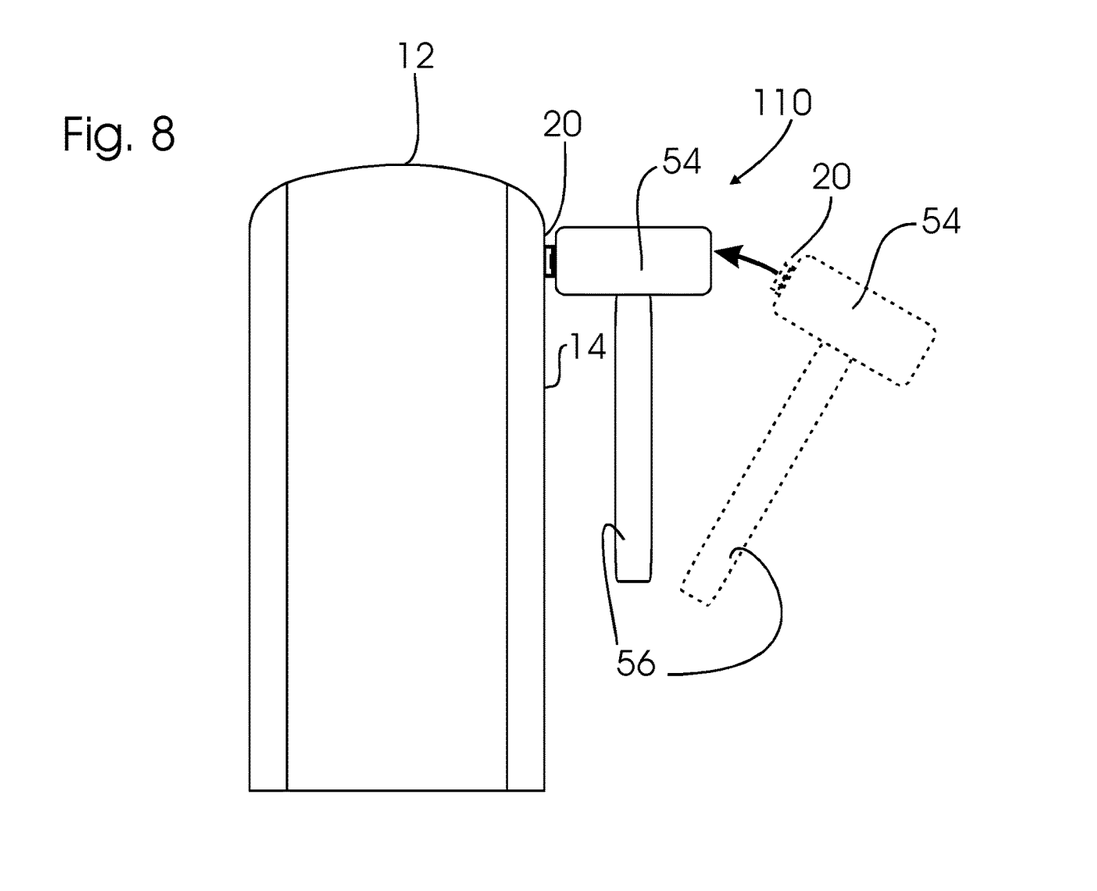
FIG. 8 shows a second embodiment of a measuring device in the form of a hammer.

The measuring device 110 is employed by using the handle 56 to strike the hammer head 54 sufficiently hard against the sidewall 14 of the tire 12 so that the sensor head 20 thereupon is pressed against the wall 14 and presses the wall 14 in before the hammer head 54 subsequently springs back.

During this process, the evaluation unit 46 connected to the sensor head 20 (not shown in FIG. 8) monitors the measured values p supplied by the sensor 36 and determines therefrom the respective maximum value p* as a measured value for the internal pressure of the tire 12.

In this embodiment as well, further values can be optionally detected by additional sensors and taken into account in the evaluation. For example, the impact and the pressing-in path d of the sensor head 20 in the wall can be determined using an additional acceleration sensor on the hammer head 54.

Figure 9:
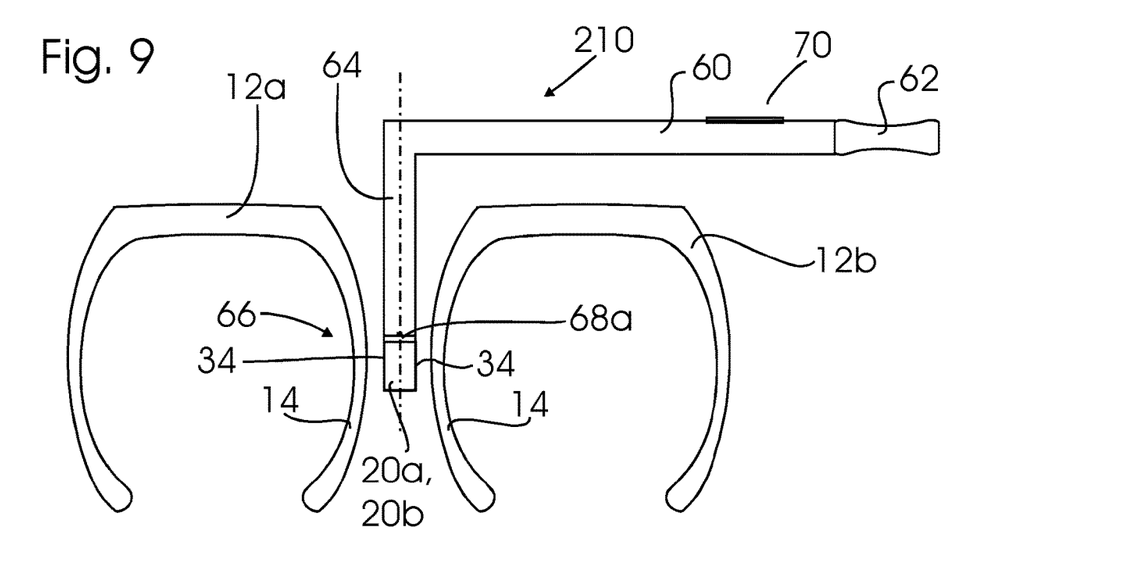
FIG. 9, FIG. 10 show a side view and front view of a third embodiment of a measuring device in the form of a swiveling lever with a spreading device.
Figure 10:
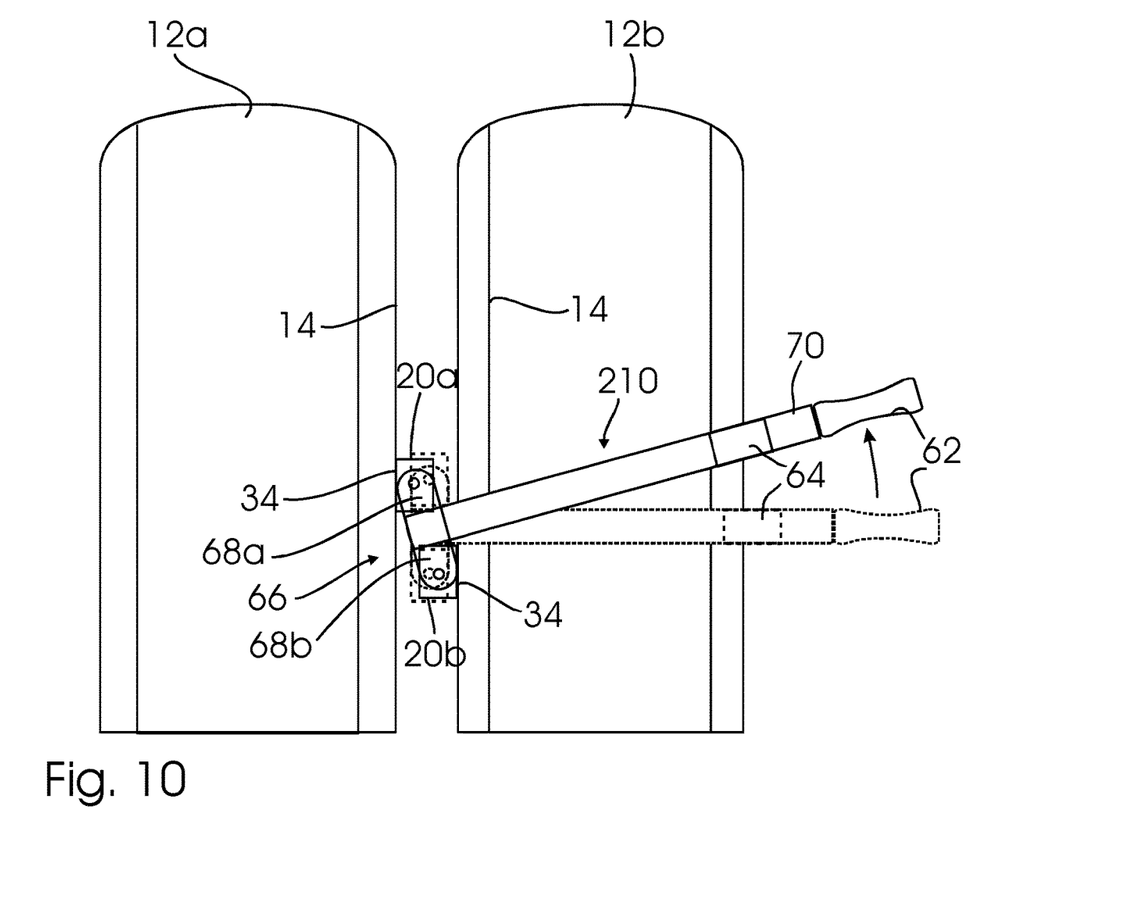

FIG. 9 and FIG. 10 in conclusion show another measuring device 210 according to a third embodiment corresponding to the aforementioned second aspect of the invention. The measuring device 210 comprises two sensor heads 20a, 20b which can be designed in a preferred embodiment, for example like the sensor heads 20 described above with reference to FIG. 2a, 2b, or respectively 3, and are suitable to determine the pressure in a tire by pressing a respective contact surface 34 against the wall 14. The sensor heads 20 are arranged such that the contact surfaces 34 face in opposite directions.

In this case, the measuring device 210 serves to measure the pressure in two adjacently arranged dual tires 12a, 12b. The measuring device comprises a swiveling lever 60 with a handle 62 attached to one end and an extension 64 attached to the other end with a spreading device 66 for the sensor heads 20a, 20b.

As shown in FIGS. 9 and 10, the measuring device 210 is positioned on the dual tires 12a, 12b in that the swiveling lever 60 is initially arranged parallel to the wheel axes, and the spreading device 66 with the sensor heads 20a, 20b is positioned between the inner tire sidewalls 14 arranged adjacently at a distance.

Then as portrayed in FIG. 10, the swiveling lever 60 is swung about an axis that is arranged horizontally in FIG. 9. On the spreading device 66, this causes the sensor heads 20a, 20b which are each pivotably fastened to projecting tabs 68a, 68b on both sides to move in the opposite direction and be pressed against opposing inner sidewalls 14 of the dual tires 12a, 12b.

By swinging the swiveling arm 60 a sufficient extent, the sensor heads 20a, 20b have been spread further and thus cause the wall 14 of the dual tires 12a, 12b to be pressed in so that, as described above, pressure values $p_1^*$, $p_2^*$ can be determined for the pressures in the dual tires 12a, 12b by evaluating the measured values p detected at the sensor heads 20a, 20b. The evaluation device 46 (not shown in FIG. 9 and FIG. 10) is attached to the swiveling lever 60 and connected to a display device 70 on which the determined pressure values $p_1^*$, $p_2^*$ are directly displayed.

Figure 11:
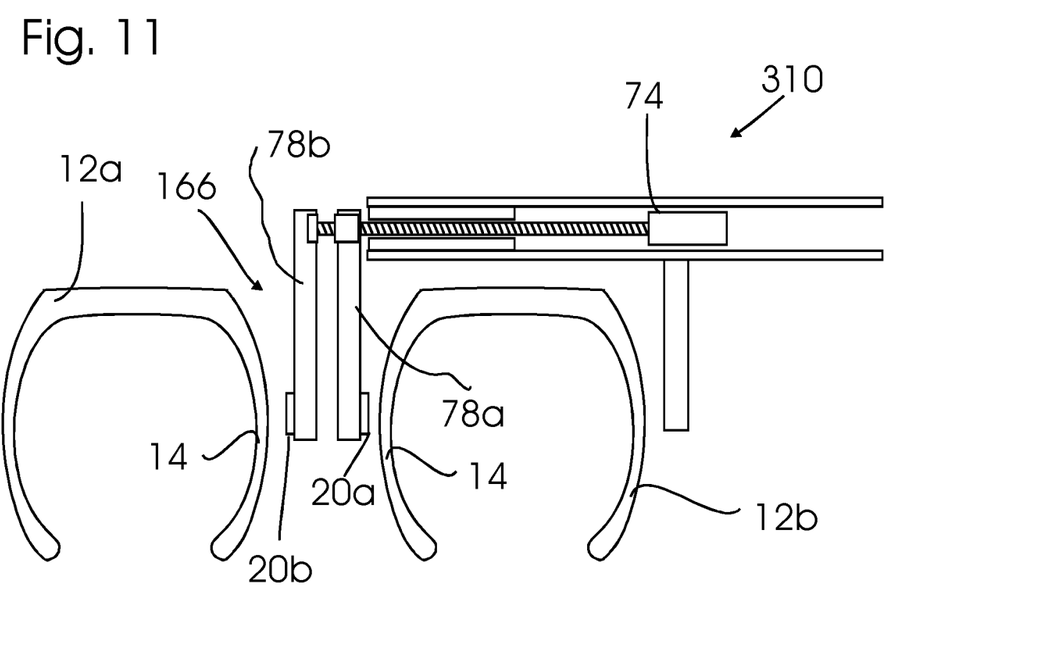
FIG. 11, FIG. 12 show a schematic view of a longitudinal section of a fourth embodiment of a measuring device.
Figure 12:
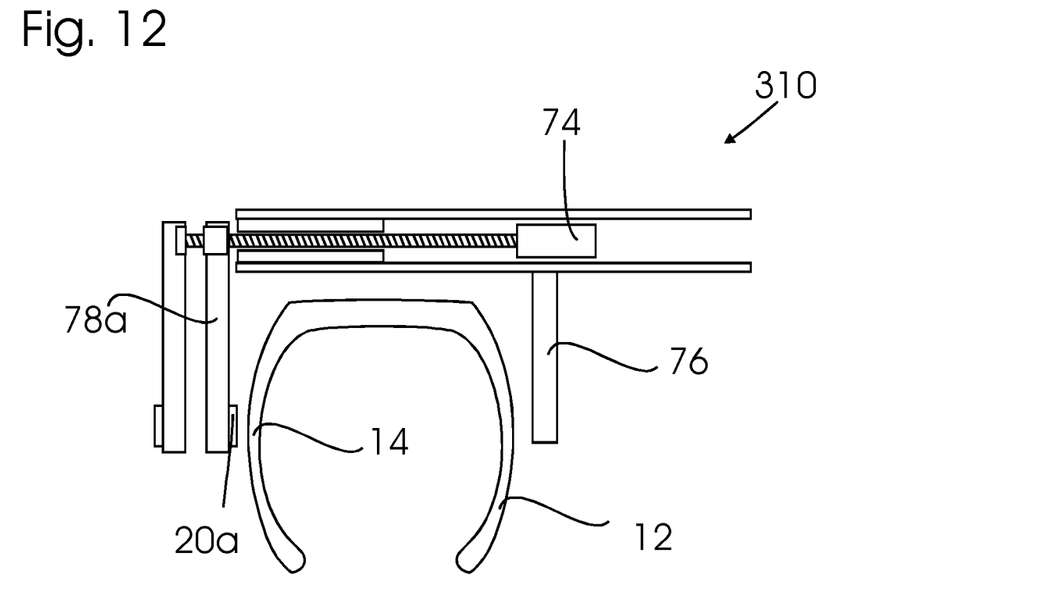

As an additional embodiment, FIG. 11,12 show a measuring device 310 that enables both the measurement of a single tire 12 by clamping (FIG. 12) as well as the measurement of dual tires (12a, 12b) (FIG. 11) by means of a motor-driven linear feed device 74 which is only schematically portrayed (motor with spindle drive). To measure the individual tire 12, it is clamped by means of a spreading device 166 between a counter bearing 76 and a first arm 78a with a first sensor head 20a so that the sensor head 20a is pressed against the wall 14 by means of the linear feed device 74 for measuring. To measure the dual tires 12a, 12b, the spreading device 166 is positioned with the first arm 78a and a second arm 78b with a second sensor head 20b between the tires 12a, 12b. By operating the linear feed device 74, the arms 78a, 78b are moved apart from each other so that the sensor heads 20a, 20b for measuring are pressed against the opposite walls 14 of the tires 12a, 12b.

The shown embodiments of measuring devices 10, 110, 210, 310 as well as the sensor heads 20, 120 used therewith are only examples of embodiments which can each be combined with each other as desired. Numerous additional modifications are also conceivable.

For example, the location of the plate 38 on the detection region 32 of the sensor heads 20, 120 can be detected so that for example tilting is discernible. For this, other sensors can be provided in addition to the pressure sensor 36, or respectively the force sensor 37, in particular angle sensors, position sensors or displacement sensors for the plate 38 or for sections thereof. For example, the distances to the vessel floor 26 can be detected, for example by means of optical sensors, at opposite sections of the plate 38. The location of the plate 38 can be determined therefrom, and for example a tilt can be recognized.

Figure 7A:
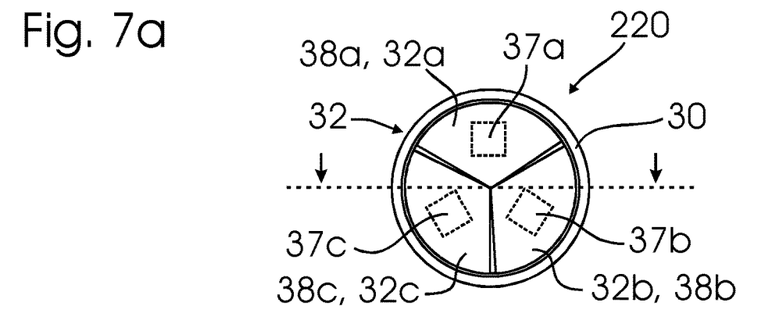
FIG. 7a, 7b show a front view and a cross-sectional view of a third embodiment of a sensorhead.
Figure 7B:
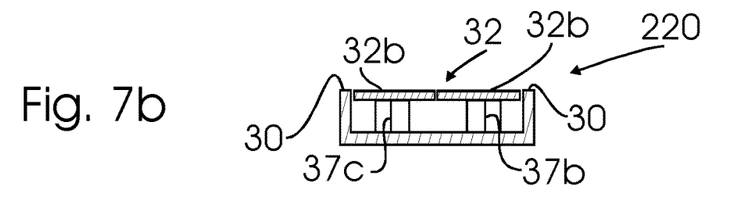

Alternatively or additionally according to a third embodiment of a sensor head 220 according to FIG. 7a, 7b, the detection region 32 can be divided into several subregions, in this case for example a first subregion 32a, second subregion 32b and third subregion 32c which are each assigned a sensor 37a, 37b, 37c. In the embodiment according to FIG. 7a, 7b, a separate plate 38a, 38b, 38c is provided for each of the partial detection regions 32a, 32b, 32c.

By evaluating the signals from the three sensors 37a, 37b, 37c, it can be determined if the force exerted by the wall 14 of the tire on the detection region 32 is even, which can be recognized by substantially equivalent measured values from the three sensors.

In addition, various modifications of the measuring devices 10, 110, 210 and sensor heads 20, 120, 220 are also possible. In particular, a much wider support edge 30 can be used instead of a sensor head with a relatively narrow support edge 30 in comparison to the width of the detection region 32.

The invention claimed is:

1. A device for measuring a pressure in a pressurized vessel, such as a tire, said vessel having an at least partially flexible wall, said device comprising:
a sensor head including a contact surface, and a device for pressing said contact surface against the flexible wall of the pressurized vessel to deform said flexible wall, wherein the sensor head has a detection region of the contact surface and a support edge that surrounds the detection region, said support edge being arranged in a continuation of the contact surface, wherein, in the detection region, a detection device is provided for detecting a measured value for a force or a pressure, and wherein an evaluation unit is provided, said evaluation unit being disposed to evaluate a progression of the measured value over time or distance during a movement of the sensor head relative to the flexible wall during deformation of the flexible wall to determine, from a portion of said progression indicating that a pressure acting on the detection region is at least substantially equal to a pressure acting on the support edge, a contact measured value, said evaluation unit being disposed to determine a pressure value corresponding to the contact measured value.

2. The device according to claim 1, wherein:
the evaluation unit is disposed to determine a maximum value of the progression of the measured value as said contact measured value.

3. The device according to claim 2, wherein:
the sensor head is a first sensor head,
and a second sensor head is provided, the second sensor head being also designed to measure a pressure in a vessel by pressing a contact surface of the second sensor head against a wall of a vessel,
wherein between the first and the second sensor head, a spreading device is provided in order to move the sensor heads in opposite directions.

4. The device according to claim 1, wherein:
a vessel is formed on the sensor head, said vessel being open toward the contact surface,
wherein the support edge is formed on a side wall of the vessel,
and wherein the detection device is arranged in the interior of the vessel.

5. The device according to claim 4, wherein:
the sensor head is a first sensor head,
and a second sensor head is provided, the second sensor head being also designed to measure a pressure in a vessel by pressing a contact surface of the second sensor head against a wall of a vessel,
wherein between the first and the second sensor head, a spreading device is provided in order to move the sensor heads in opposite directions.

6. The device according to claim 1, wherein:
the detection device on the contact surface has a plate independent of the support edge.

7. The device according to claim 6, wherein:
the sensor head is a first sensor head,
and a second sensor head is provided, the second sensor head being also designed to measure a pressure in a vessel by pressing a contact surface of the second sensor head against a wall of a vessel,
wherein between the first and the second sensor head, a spreading device is provided in order to move the sensor heads in opposite directions.

8. The device according to claim 1, wherein:
the detection device comprises a pressure sensor or a force sensor for determining a pressing force,
wherein a flexible transmission body is arranged between the contact surface and the pressure sensor or force sensor.

9. The device according to claim 8, wherein:
the sensor head is a first sensor head,
and a second sensor head is provided, the second sensor head being also designed to measure a pressure in a vessel by pressing a contact surface of the second sensor head against a wall of a vessel,
wherein between the first and the second sensor head, a spreading device is provided in order to move the sensor heads in opposite directions.

10. The device according to claim 1, wherein:
the detection region comprises at least one first and one second partial detection region, wherein the detection device has at least one first force sensor or pressure sensor for the first partial detection region, and a second force sensor or pressure sensor for the second partial detection region.

11. The device according to claim 10, wherein:
the sensor head is a first sensor head,
and a second sensor head is provided, the second sensor head being also designed to measure a pressure in a vessel by pressing a contact surface of the second sensor head against a wall of a vessel,
wherein between the first and the second sensor head, a spreading device is provided in order to move the sensor heads in opposite directions.

12. The device according to claim 1, wherein:
in a cross-section of the sensor head, the width of the support edge is less than 20% of the width of the detection region.

13. The device according to claim 12, wherein:
the sensor head is a first sensor head,
and a second sensor head is provided, the second sensor head being also designed to measure a pressure in a vessel by pressing a contact surface of the second sensor head against a wall of a vessel,
wherein between the first and the second sensor head, a spreading device is provided in order to move the sensor heads in opposite directions.

14. The device according to claim 1, wherein:
in a cross-section of the sensor head, the width of the support edge is at least 20% of the width of the detection region.

15. The device according to claim 1, wherein:
a pressing device is provided in order to press the sensor head against the wall with a pressing force.

16. The device according to claim 15, wherein:
the pressing device has a movable mass element.

17. The device according to claim 15, wherein:
the pressing device has a clamping device.

18. The device according to claim 1, wherein:
the sensor head is a first sensor head,
and a second sensor head is provided, the second sensor head being also designed to measure a pressure in a vessel by pressing a contact surface of the second sensor head against a wall of a vessel,
wherein between the first and the second sensor head, a spreading device is provided in order to move the sensor heads in opposite directions.

19. The device according to claim 18, wherein:
the spreading device is connected to a swiveling lever or to a linear feed apparatus.

20. A method for measuring a pressure in a pressurized vessel, such as a tire, said vessel having an at least partially flexible wall, wherein:

a sensor head with a contact surface is pressed against said flexible wall to deform said flexible wall, wherein the sensor head has a detection region of the contact surface and a support edge that surrounds the detection region, said support edge being arranged in a continuation of the contact surface, wherein during a movement of the sensor head relative to the flexible wall de-forming said flexible wall a measured value for a force or for a pressure acting on the detection region is detected, and a progression of said measured value over time or distance during said movement of the sensor head is evaluated, wherein a contact measured value is determined from a portion of said progression of the measured value indicating that a pressure acting on the detection region is at least substantially equal to a pressure acting on the support edge, and wherein a pressure value is assigned to the contact measured value.

* * * * *